United States Patent
Gour et al.

(10) Patent No.: US 12,462,692 B2
(45) Date of Patent: Nov. 4, 2025

(54) SYSTEM AND METHOD FOR CAMERA ASSISTED STABLE APPROACH USING SENSOR FUSION

(71) Applicant: Honeywell International Inc., Charlotte, NC (US)

(72) Inventors: Dheeraj Gour, Bangalore (IN); Anant Singh, Lucknow (IN); Jitendra Kumar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 78 days.

(21) Appl. No.: 18/593,299

(22) Filed: Mar. 1, 2024

(65) Prior Publication Data

US 2025/0232680 A1    Jul. 17, 2025

(30) Foreign Application Priority Data

Jan. 17, 2024 (IN) .............................. 202411003319

(51) Int. Cl.
   *G08G 5/26*    (2025.01)
   *B64D 45/08*   (2006.01)
   (Continued)

(52) U.S. Cl.
   CPC ............... *G08G 5/26* (2025.01); *B64D 45/08* (2013.01); *B64D 47/08* (2013.01); *G08G 5/54* (2025.01)

(58) Field of Classification Search
   CPC . G08G 5/26; G08G 5/54; B64D 45/08; B64D 47/08
   See application file for complete search history.

(56) References Cited

U.S. PATENT DOCUMENTS

| 7,106,217 B2 * | 9/2006 | Judge ..................... G05D 1/102 |
| | | 701/14 |
| 9,174,747 B2 | 11/2015 | Kang |

(Continued)

FOREIGN PATENT DOCUMENTS

| CN | 104215239 B | 2/2017 |
| CN | 111766900 A | 10/2020 |

(Continued)

OTHER PUBLICATIONS

Great Britain Intellectual Property Office, "Patents Act 1977: Search Report under Section 17(5)", dated Jun. 6, 2025, from GB Application No. GB2418745.2, from Foreign Counterpart to U.S. Appl. No. 18/593,299, pp. 1 through 6, Published: GB.

*Primary Examiner* — Mussa A Shaawat
(74) *Attorney, Agent, or Firm* — Fogg & Powers LLC

(57) ABSTRACT

A method comprises receiving a landing request from an aircraft at a ground control center of a vertiport; activating infrared cameras at a vertiport landing site when the request is approved; searching for the aircraft based on light strobes on the aircraft using the infrared cameras; creating a virtual current approach frame of the aircraft when the light strobes are detected by the infrared cameras; and comparing the virtual current approach frame to a predefined approach frame to determine whether a landing approach of the aircraft is suitable. If the landing approach is not suitable, sending feedback to the aircraft from the ground control center to provide guidance for the landing approach based on a difference between the predefined approach frame and the virtual current approach frame. The method further comprises projecting a conical area for aircraft detection that includes virtual approach rings having threshold values based on aircraft parameters.

20 Claims, 6 Drawing Sheets

(51) Int. Cl.
   *B64D 47/08* (2006.01)
   *G08G 5/54* (2025.01)

(56) References Cited

U.S. PATENT DOCUMENTS

| | | | | |
|---|---|---|---|---|
| 10,024,686 | B2* | 7/2018 | Canale | G01S 13/933 |
| 10,403,158 | B2* | 9/2019 | Lieberman | B64D 45/08 |
| 10,657,827 | B2 | 5/2020 | Eyhorn | |
| 10,994,838 | B2* | 5/2021 | DeLorean | B64D 27/32 |
| 11,435,762 | B1* | 9/2022 | Auerbach | B64D 27/34 |
| 11,479,365 | B2 | 10/2022 | Chen et al. | |
| 2009/0138138 | A1* | 5/2009 | Ferren | G05D 1/0676 |
| | | | | 359/333 |
| 2009/0251540 | A1* | 10/2009 | Aspen | H04N 7/18 |
| | | | | 348/E7.085 |
| 2010/0023189 | A1* | 1/2010 | Suddreth | G01C 23/00 |
| | | | | 701/16 |
| 2012/0314032 | A1* | 12/2012 | Muensterer | G01S 7/51 |
| | | | | 348/46 |
| 2013/0001366 | A1* | 1/2013 | Wolff | B64F 1/027 |
| | | | | 244/183 |
| 2014/0207315 | A1* | 7/2014 | He | G01C 23/005 |
| | | | | 701/16 |
| 2016/0259333 | A1 | 9/2016 | Ducharme | |
| 2017/0162066 | A1* | 6/2017 | Scacchi | G08G 5/54 |
| 2018/0009546 | A1* | 1/2018 | Filias | G08G 5/21 |
| 2018/0061243 | A1* | 3/2018 | Shloosh | G08G 5/21 |
| 2018/0130363 | A1* | 5/2018 | Yvetot | G08G 5/32 |
| 2018/0217596 | A1* | 8/2018 | Groden | B64D 45/08 |
| 2018/0222602 | A1* | 8/2018 | Salesse-Lavergne | |
| | | | | B64D 45/08 |
| 2020/0026309 | A1* | 1/2020 | Ma | B64U 50/37 |
| 2020/0239138 | A1 | 7/2020 | Raptopoulos et al. | |
| 2020/0310467 | A1* | 10/2020 | Birkedahl | G05D 1/0676 |
| 2020/0334993 | A1* | 10/2020 | Demri | G08G 5/34 |
| 2021/0082295 | A1* | 3/2021 | Surace | G06V 20/176 |
| 2021/0150919 | A1* | 5/2021 | Schaferlein | G08G 5/22 |
| 2021/0225180 | A1* | 7/2021 | S | G06T 7/70 |
| 2021/0371123 | A1* | 12/2021 | List | B64D 31/06 |
| 2021/0375146 | A1 | 12/2021 | Adolf et al. | |
| 2022/0017235 | A1* | 1/2022 | Lee | G01S 5/16 |
| 2022/0041298 | A1* | 2/2022 | Schurek | B64D 43/00 |
| 2022/0057473 | A1 | 2/2022 | Amarnathan et al. | |
| 2022/0136860 | A1* | 5/2022 | Dong | G06V 10/147 |
| | | | | 701/16 |
| 2022/0413514 | A1* | 12/2022 | Moy | G06T 19/006 |
| 2023/0016277 | A1* | 1/2023 | Bravo Orellana | G06T 7/579 |
| 2023/0161341 | A1 | 5/2023 | Montoya et al. | |
| 2023/0286670 | A1* | 9/2023 | Lepage | G08G 5/21 |
| 2023/0393590 | A1* | 12/2023 | Gurusamy | G05D 1/102 |
| 2024/0112587 | A1* | 4/2024 | True | G08G 5/55 |
| 2024/0124153 | A1* | 4/2024 | Venkataswamy | G01C 23/00 |

FOREIGN PATENT DOCUMENTS

| | | |
|---|---|---|
| CN | 113448351 A | 9/2021 |
| CN | 114013674 A | 2/2022 |
| CN | 114706420 A | 7/2022 |
| EP | 3816649 A1 | 5/2021 |
| EP | 4187207 A1 | 5/2023 |
| WO | 2018231166 A1 | 12/2018 |
| WO | 2022101892 A1 | 5/2022 |

* cited by examiner

SYSTEM AND METHOD FOR CAMERA ASSISTED STABLE APPROACH USING SENSOR FUSION

CROSS-REFERENCE TO RELATED APPLICATIONS

This application claims the benefit of and priority to Indian Patent Application No. 202411003319, filed on Jan. 17, 2024, of the same title, which is hereby incorporated herein by reference in its entirety.

BACKGROUND

A stable approach and landing of an aircraft are a critical phase of flight. In particular, a stable approach and landing of an aircraft such as a vertical takeoff and landing (VTOL) aircraft in a vertical port (vertiport) environment is critical because of the limited space available at a vertiport airfield. In the case of VTOL aircraft, it is crucial that correct approach guidance be followed for a safe landing, because of the vertiport orientation and dimensions compared to conventional airports.

Various hazardous situations can occur if an unstable landing approach of a VTOL aircraft occurs. For example, if the approach to a vertiport is not at a desired speed (over-speed or under-speed) and there is an incorrect descent altitude trajectory, an unstable and dangerous landing of the aircraft can occur at the vertiport. This may cause structural damage to the aircraft and injuries to crew members and passengers. In addition, accidental collisions with other aerial vehicles may occur because of an unstable aircraft approach toward the vertiport. In this situation, there is a high possibility of hitting other vehicles moving in to approach the vertiport and its surroundings while there are other vehicles hovering in nearby vertiport air space.

Thus, methods for assisting a stable guided approach to a vertiport landing site is needed for performing a precise approach and safe landing of a VTOL aircraft.

SUMMARY

A method comprises receiving a landing request from an aircraft at a ground control center of a vertiport; activating one or more infrared cameras located at a landing site of the vertiport when the received landing request is approved by the ground control center; and searching for the aircraft based on one or more light strobes located on the aircraft using the one or more infrared cameras. The method further comprises creating a virtual current approach frame of the aircraft when the light strobes are detected by the one or more infrared cameras; and comparing the virtual current approach frame to a predefined approach frame stored by the ground control center to determine whether a landing approach of the aircraft is suitable to provide a safe landing for the aircraft. If the landing approach of the aircraft is not suitable, sending correctional feedback information to the aircraft from the ground control center to provide corrected guidance for the landing approach based on a difference between the predefined approach frame and the virtual current approach frame. The method further includes projecting a conical area for aircraft detection, the conical area including a set of virtual approach rings each having predicted approach threshold values based on aircraft parameters.

BRIEF DESCRIPTION OF THE DRAWINGS

Aspects of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
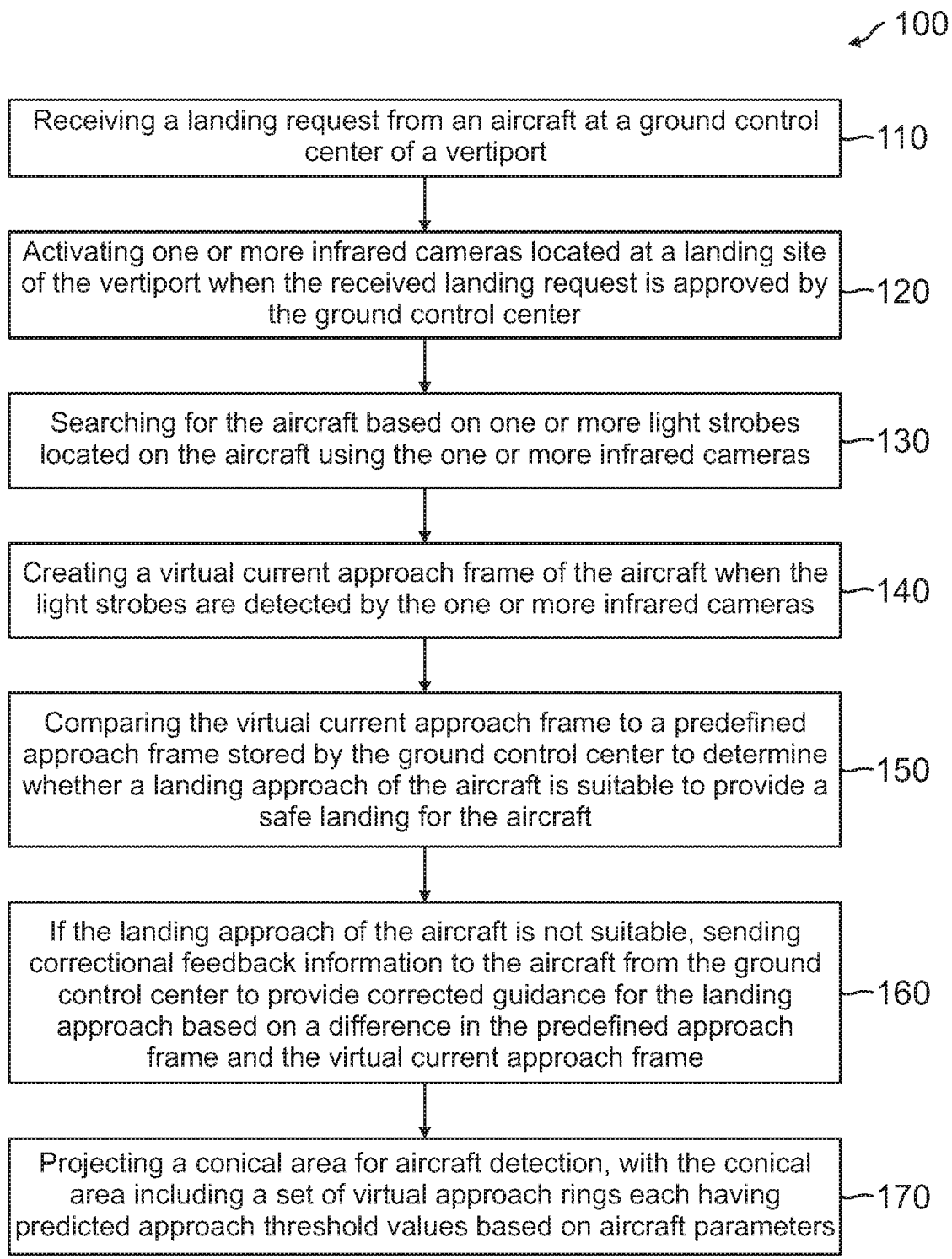
FIG. 1 is a flow diagram of a method for a stable landing approach of an aircraft, according to one implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for camera assisted sensor fusion techniques providing a stable approach for aircraft, are described herein. The present systems and methods provide enhanced situational awareness and stable approach guidance to aircraft, such that a safe landing at a vertiport landing area can be performed. The aircraft can be provided with suitable approach parameters, such as final descent speed, and stable approach height for descent and hovering, based on real time approach guidance Various aircraft can take advantage of the present techniques, including crewed aircraft, uncrewed aircraft, vertical takeoff and landing (VTOL) aircraft, urban air mobility (UAM) vehicles, or the like. The present system can provide stable approach guidance for such vehicles based on real time situational parameters, which can be provided to a pilot of a crewed aircraft, or to a remote pilot controller of an uncrewed aircraft. A vertiport ground control can be coupled with guidance support using the camera assisted sensor fusion techniques for UAM vehicle operations. The present techniques also provide for full UAM autonomy operations.

The present system enables a stable approach landing of a UAM vehicle by providing approach parameters to a flight guidance system of the UAM vehicle. The system provides correct approach parameters based on a current location of the UAM vehicle near a vertiport.

A system for stable approach guidance and landing of aircraft generally comprises various ground-based subsystems located at a vertiport, and various airborne subsystems located onboard an aircraft. The ground-based subsystems include a camera system, a sensor fusion system, and a ground landing light system. The camera system includes a set of cameras such as infrared (IR) cameras, which are located at a landing site of the vertiport. The sensor fusion system includes a light detection and ranging (LiDAR) unit that cooperates with the cameras to produce an image that is a three-dimensional (3D) rendering of a landing space over the landing site. The ground landing light system includes a group of colored landing lights placed around the landing site. The airborne subsystems include a light strobe system, and a visual/aural warning system. The light strobe system includes a set of light probes such as IR probes mounted externally on the aircraft. The visual/aural warning system can be provided in a cockpit display onboard the aircraft.

In one embodiment, an IR strobe system on a UAM vehicle can be used with ground based IR cameras and a LiDAR system to creates a 3D image, and a radio altimeter can provide a height of the UAM vehicle. An onboard camera of the UAM vehicle can scan for a vertiport symbol to aim the aircraft for a suitable area locked for the landing.

The present method calculates a difference between a suitable approach and a current approach of the aircraft. The ground cameras are used to detect a distance of the aircraft from the landing site, providing real time feedback about approach parameters to the aircraft vehicle. The method also projects a conical area for aircraft detection, with the conical area including a set of virtual approach rings each having predicted approach threshold values based on aircraft parameters. The approach rings provide for determining a correct approach by differentiating a descent altitude based on the terrain and other obstructions near a landing site, as well as the energy of the aircraft. The ground landing lights can be controlled based on the camera and sensor fusion, providing feedback to a pilot to know whether the approach is stable and needs correction. This can be based on the guidance provided when the aircraft passes through the approach rings, with assisted input being provided to control a speed and orientation of the aircraft. The present method can enhance the situational awareness of a pilot using a human machine interface such as a cockpit display, in the critical phase of approach and landing.

It is necessary to identify a real time final descent airspeed and orientation of the aircraft in a descent profile, as excess energy of the aircraft because of different vehicle configurations can make it difficult for a pilot to stabilize the aircraft. In addition, a pilot related error in manually landing the vehicle can cause loss of control during the approach. As such, ground-controlled situational guidance as provided by the present methods can be helpful and faster in these situations, and can handle any congestion caused by other vehicles near a vertiport. In addition, various vertiports have elevations that are different and include the surrounding environment, so providing situational guidance can help a pilot in the approach without much stress, especially during a single pilot operation of a UAM vehicle.

Conventional air traffic management systems typically provide several manual instructions to a pilot when an aircraft is approaching a busy airport, such as by providing manual guidance to the pilot to maintain an altitude and speed of the aircraft. The present system automates such manual instructions and communicates automatically with the aerial vehicle with accuracy to guide vehicle operations. This is advantageous in a dense city area, which requires more accurate safety measures for UAM operations.

In addition, the present methods can be used to regulate UAM vehicle traffic approaching vertiport landing sites. For example, the present methods can be used in queuing multiple UAM vehicles to provide a stable landing approach for each vehicle in turn.

The present techniques can provide situational guidance during landing in adverse situations, such as low visibility conditions, adverse weather, obstructions caused due to nearby terrain, and other vehicles nearby performing an approach. For example, the present method can guide an aircraft to a safe landing irrespective of visibility at the landing area; can guide the aircraft to a safe landing through unfavorable weather conditions; can guide the aircraft through different obstructions present due to surrounding terrain; and can assist aircraft approach and hovering conditions in emergency situations.

The present method can assist crewed and uncrewed aircraft in performing a safe approach at a vertiport landing site. For example, the method can assist UAM vehicles operating with a single pilot in landing safely at landing sites situated in urban environments, where the elevation of buildings can be different, especially in high density urban areas. The method can also be used to identify the suitability of a landing location in case of a system failure or pilot incapacitation.

Further details of various embodiments are described hereafter and with reference to the drawings.

FIG. 1 is a flow diagram of a method 100 for a stable approach and landing of an aircraft such as a VTOL aircraft, according to one implementation. The method 100 includes receiving a landing request from an aircraft at a ground control center of a vertiport (block 110), and activating one or more infrared (IR) cameras located at a landing site of the vertiport when the received landing request is approved by the ground control center (block 120). The method 100 then proceeds with searching for the aircraft based on one or more light strobes located on the aircraft using the one or more infrared cameras (block 130), and creating a virtual current approach frame of the aircraft when the light strobes are detected by the one or more infrared cameras (block 140). The method 100 then compares the virtual current approach frame to a predefined approach frame stored by the ground control center to determine whether a landing approach of the aircraft is suitable to provide a safe landing for the aircraft. (block 150).

If the landing approach of the aircraft is not suitable, method 100 includes sending correctional feedback information to the aircraft from the ground control center to provide corrected guidance for the landing approach based on a difference in the predefined approach frame and the virtual current approach frame (block 160). The corrected guidance can be based on a speed, altitude, and descent rate of the aircraft using a sensor fusion system and current state data of the aircraft. The method 100 also includes projecting a conical area for aircraft detection, with the conical area including a set of virtual approach rings each having predicted approach threshold values based on aircraft parameters (block 170). The conical area can be projected using the sensor fusion system, and the predicted approach threshold values can be based on the speed, altitude, and descent rate of the aircraft. As described further hereafter, the virtual approach rings can be dynamically variable and can comprise an initial approach ring, a decision approach ring, and a final approach ring.

Figure 2:
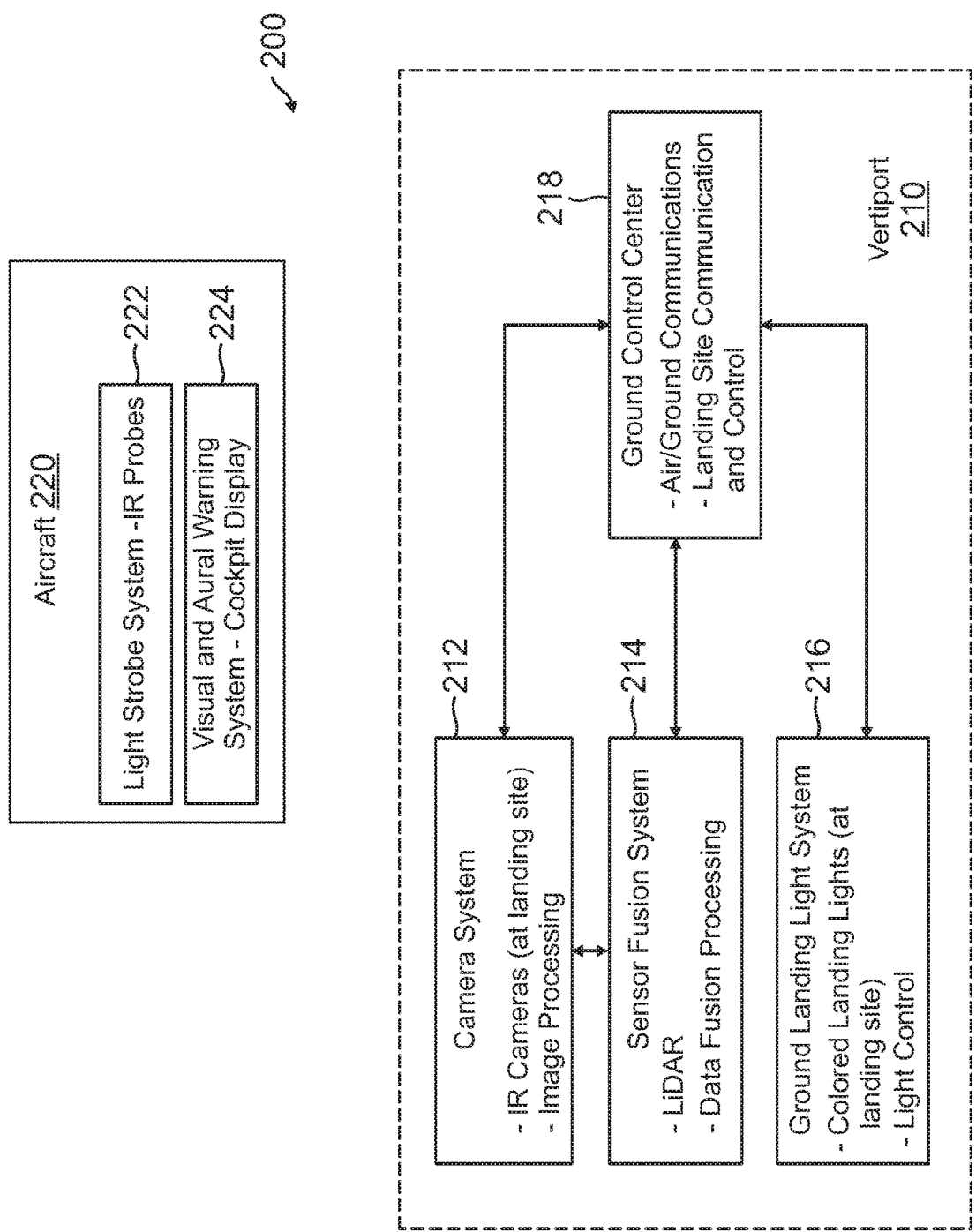
FIG. 2 is a block diagram of a system for a stable landing approach of an aircraft, according to according to one embodiment.

FIG. 2 is a block diagram of a system 200 for stable approach guidance and landing of aircraft at a vertiport 210, according to one embodiment. The system 200 comprises various ground-based subsystems located at vertiport 210, including a camera system 212, a sensor fusion system 214 in operative communication with camera system 212, and a ground landing light system 216. A ground control center 218 operatively communicates with camera system 212, sensor fusion system 214, and ground landing light system 216. The camera system 212 and sensor fusion system 214 indirectly communicate with ground landing light system 216 via ground control center 218.

The camera system 212 includes a set of cameras such as IR cameras, which are located at a landing site of vertiport 210. The camera system 212 also provides image processing of image data captured by the cameras. The sensor fusion system 214 includes a light detection and ranging (LiDAR)

unit in operative communication with the cameras of camera system 212. The LiDAR unit is configured to produce an image that is a three-dimensional (3D) rendering of a landing space over the landing site. The sensor fusion system 214 also provides data fusion processing. In some embodiments, the camera system 212 can include high fidelity cameras that incorporate LiDAR devices within the same unit.

The ground landing light system 216 includes a set of lights placed around the landing site. The ground landing light system 216 also provides for light control such that the landing lights change color depending on approach parameters of the aircraft.

The system 200 also comprises airborne subsystems located onboard aircraft such as an aircraft 220. The airborne subsystems include a light strobe system 222, and a visual and aural warning system 224. The light strobe system 222 includes a set of light strobes or probes, such as IR strobes or probes mounted externally on the aircraft 220. The visual and aural warning system 224 can be provided in a cockpit display onboard the aircraft 220.

The various ground-based subsystems and airborne subsystems of system 200 are described in further detail as follows.

Camera System

The camera system 212 includes one or more cameras, such as specialized IR cameras, and at least one processor in operative communication with the cameras. The cameras are located around a landing site, such as in a circular pattern. The camera system 212 is activated when the ground control center 218 receives a landing request from any incoming aircraft such as aircraft 220. For example, a landing request can be sent by aircraft 220 from a request queue of aircraft. The cameras search for the aircraft on the basis of light probes located on the aircraft frame. When the light probes are detected, the camera system 212 is operative to create a virtual current approach frame of the aircraft, which is then compared to a predefined ideal approach frame stored by the ground control center 218. The cameras continue to track the aircraft until a successful landing is performed.

During landing maneuvers, the camera system 212 continues comparing the virtual current approach frame and the predefined ideal approach frame. The ground control center 218 provides the aircraft with guidance to correct its approach based on a difference between the predefined ideal approach frame and the virtual current approach frame. The guidance can based on a defined speed, altitude, and descent rate, using sensor fusion techniques and current vehicle state data in defined virtual approach rings with threshold values, as described further hereafter.

Figure 3:
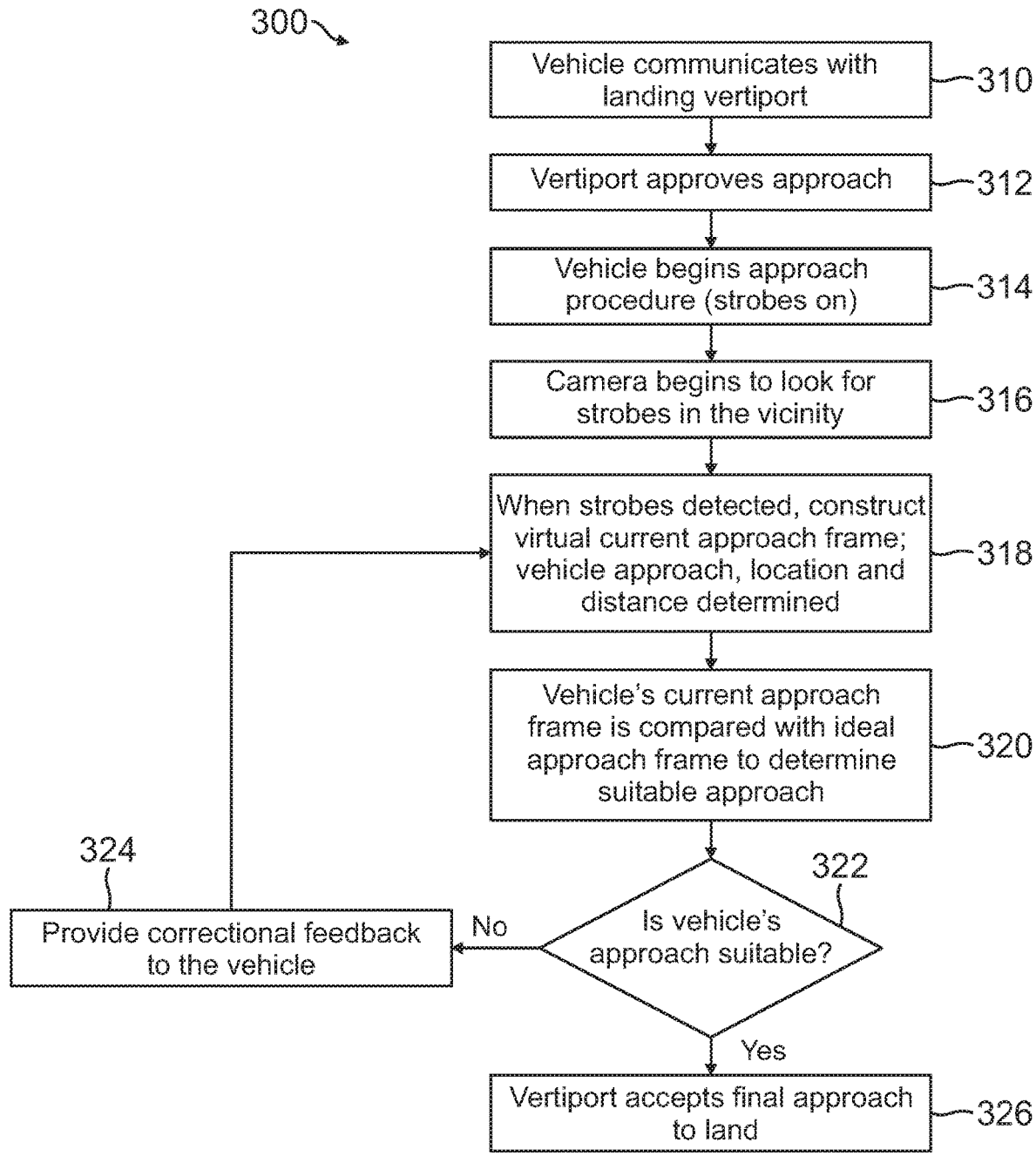
FIG. 3 is a flow diagram of a method for a stable approach and landing of a VTOL vehicle, according to an example implementation.

FIG. 3 is a flow diagram of a method 300 for a stable approach and landing of a VTOL vehicle, according to an example implementation, which illustrates the camera system operation. Initially, the vehicle communicates with a landing vertiport (block 310), to request approval of a landing approach for the vehicle. When the vertiport approves the approach (block 312), the approved vehicle begins an approach procedure, with onboard IR strobes being turned on (block 314). A ground camera begins to look for IR strobes in the vicinity of the vertiport (block 316). When the IR strobes are detected, method 300 constructs a virtual current approach frame, and the current vehicle approach, location and distance are determined (block 318). The vehicle's virtual current approach frame is compared with a predefined ideal approach frame to determine a suitable approach (block 320). The method 300 then determines whether the vehicle's approach is suitable (block 322). If not, method 300 provides correctional feedback to the vehicle (block 324), and repeats starting at block 318. If method 300 determines that the vehicle's approach is suitable (at block 322), then the vertiport accepts the final approach to land (block 326).

Sensor Fusion System

Returning to FIG. 2, in the sensor fusion system 214, the LiDAR unit cooperates with the camera system 212 to project a conical area above the landing site for aircraft detection. The conical area includes virtual approach rings each operative to predict an approach threshold based on the speed and altitude of the aircraft. The size and altitude of the virtual approach rings can dynamically vary depending on the surroundings of the landing site and the structure of the aircraft.

An image of the conical area can be shown as a 3D rendering of the landing space on a display system, where each of the virtual approach rings can be a 3D circle. As soon as the aircraft touches one of the virtual approach rings, the sensor fusion system 214 can determine a position and approach path of the aircraft, with the help of interference signals created by the aircraft as it passes through each of the virtual approach rings. This allows correctional feedback to be sent to the aircraft for its approach before the aircraft touches the next virtual approach ring. Each virtual approach ring can provide threshold limits for the speed and desired descent rate of the aircraft.

As mentioned previously, the virtual approach rings can comprise an initial approach ring, a decision approach ring, and a final approach ring. The initial approach ring is configured to confirm a decision from the aircraft to start approach and landing activity, and communication begins with the ground control center 218. The decision approach ring is configured to ensure the aircraft is following a corrected approach path based on corrected guidance provided by the ground control center 218, and can be used to abort the approach if the aircraft is unstable and needs to retry the approach. The final approach ring is configured to restrict the aircraft to follow calculated speed and descent rate data gathered from the sensor fusion system 214.

Figure 4:
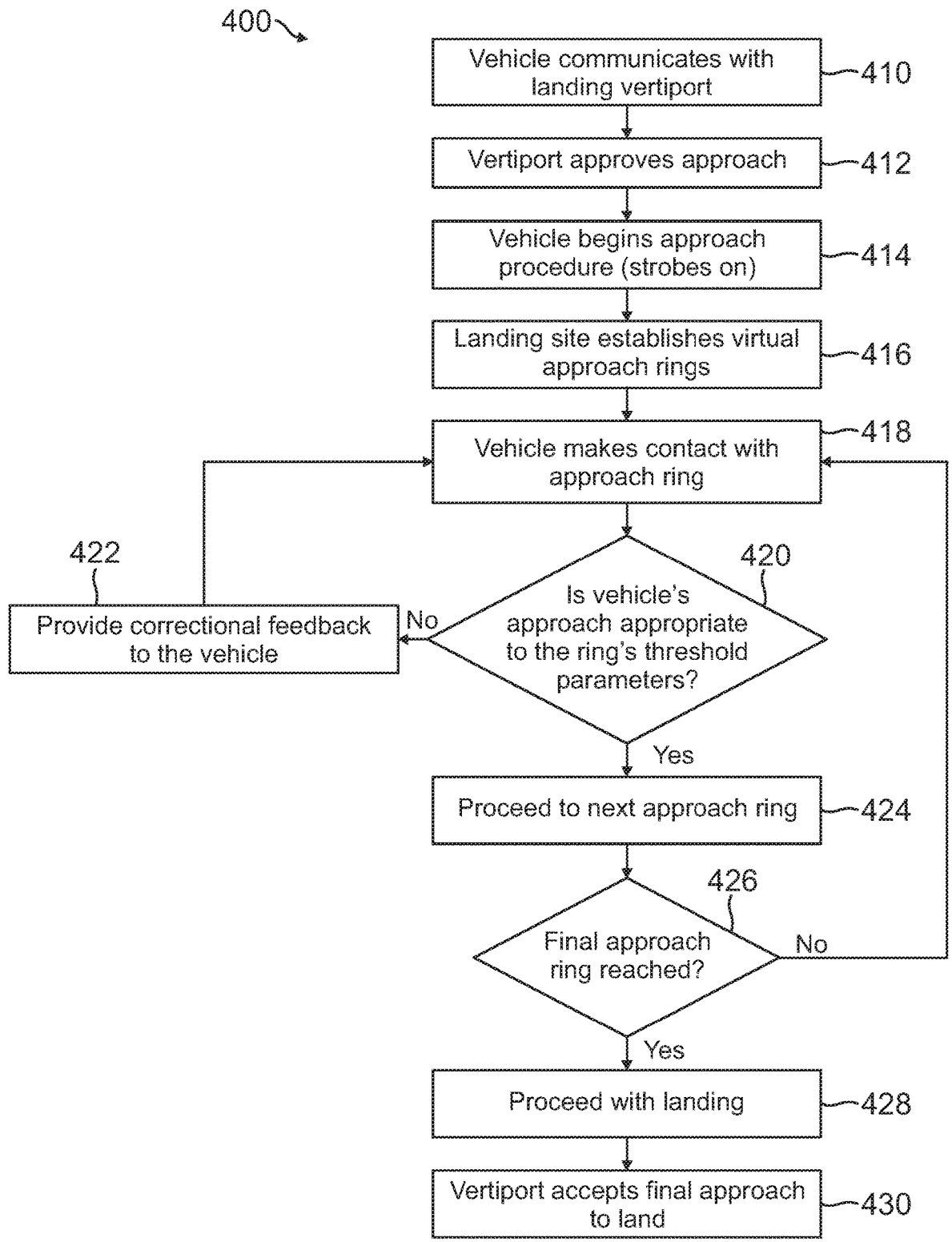
FIG. 4 is a flow diagram of a method for a stable approach and landing of a VTOL vehicle, according to a further example implementation.

FIG. 4 is a flow diagram of a method 400 for a stable approach and landing of a VTOL vehicle, according to an example implementation, which illustrates the sensor fusion system operation. Initially, the vehicle communicates with a landing vertiport (block 410), to request approval of a landing approach for the vehicle. When the vertiport approves the approach (block 412), the vehicle begins an approach procedure, with onboard strobes being turned on (block 414). A landing site at the vertiport establishes the virtual approach rings (block 416). When the vehicle makes contact with an approach ring (block 418), method 400 determines whether the vehicle's approach is appropriate to the approach ring's threshold parameters (block 420). If not, method 400 provides correctional feedback to the vehicle (block 422), and repeats starting at block 418. If method 400 determines that vehicle's approach is appropriate (at block 420), then the vehicle proceeds to the next approach ring (block 424). A determination is made whether a final approach ring has been reached (block 426). If not, method 400 repeats starting at block 418. If the determination is made that the final approach ring has been reached (at block 426), method 400 proceeds with landing the vehicle (block 428), and the vertiport accepts the final approach to land (block 430).

Ground Landing Light System

Returning to FIG. 2, ground landing light system 216 includes an arrangement of colored landing lights placed around the landing site, and provides for light control such that the landing lights change color depending on approach parameters of the incoming aircraft. The color of the lights can be determined based on the approach aircraft orientation in a virtual approach ring, as determined by the sensor fusion system 214. The change of color of the landing lights is helpful in providing visual assistance to a pilot regarding the aircraft's approach.

For example, the ground landing light system 216 can display one color of the landing lights (e.g., red) when the aircraft is approaching the virtual approach rings, which can be determined as per precalculated parameters. The ground landing light system 216 can display a different color of the landing lights (e.g., green) based on the interaction between the virtual approach rings and the aircraft's parameters. The ground landing light system 216 helps the aircraft to correct its approach based on the visual support provided thereby.

Light Strobe System

As mentioned previously, the light strobe system 222 includes a set of light strobes or probes mounted externally on the aircraft. For example, IR strobe lights can be placed on each corner of the aircraft's frame. These IR strobe lights would be visible to the IR cameras at the landing site.

The position of the IR strobe lights on the aircraft enables the camera system 212 to construct the current virtual approach frame along with the virtual approach rings. The IR strobe lights are helpful to the camera system 212 in determining the aircraft frame in any kind of visual condition irrespective of the surrounding environment, eliminating most errors that the system can make in recognizing the aircraft.

Visual and Aural Warning System

As mentioned previously, the visual and aural warning system 224 can be provided in a cockpit display onboard the aircraft. Alternatively, the visual and aural warning system can be provided on a display for use by a remote control operator present on the ground when the aircraft is uncrewed. In this case, the remote control operator can see the image from the point of view of the aircraft.

The visual and aural warning system 224 is configured to activate a visual alert and/or an aural alert for the pilot in case there is a deviation of the aircraft from the virtual approach rings. The visual and aural warning system 224 receives information from the ground control center 218 about guidance in terms of speed limit thresholds in each virtual approach ring, to allow the pilot to maintain a desired speed to avoid a harsh landing of the aircraft.

In addition, the visual and aural warning system 224 can be configured to activate a microphone when the aircraft enters the initial approach ring. This allows the pilot to communicate with the ground control center 218 to initiate the approach sequence.

Example Landing Approach Sequence

Figure 5A:
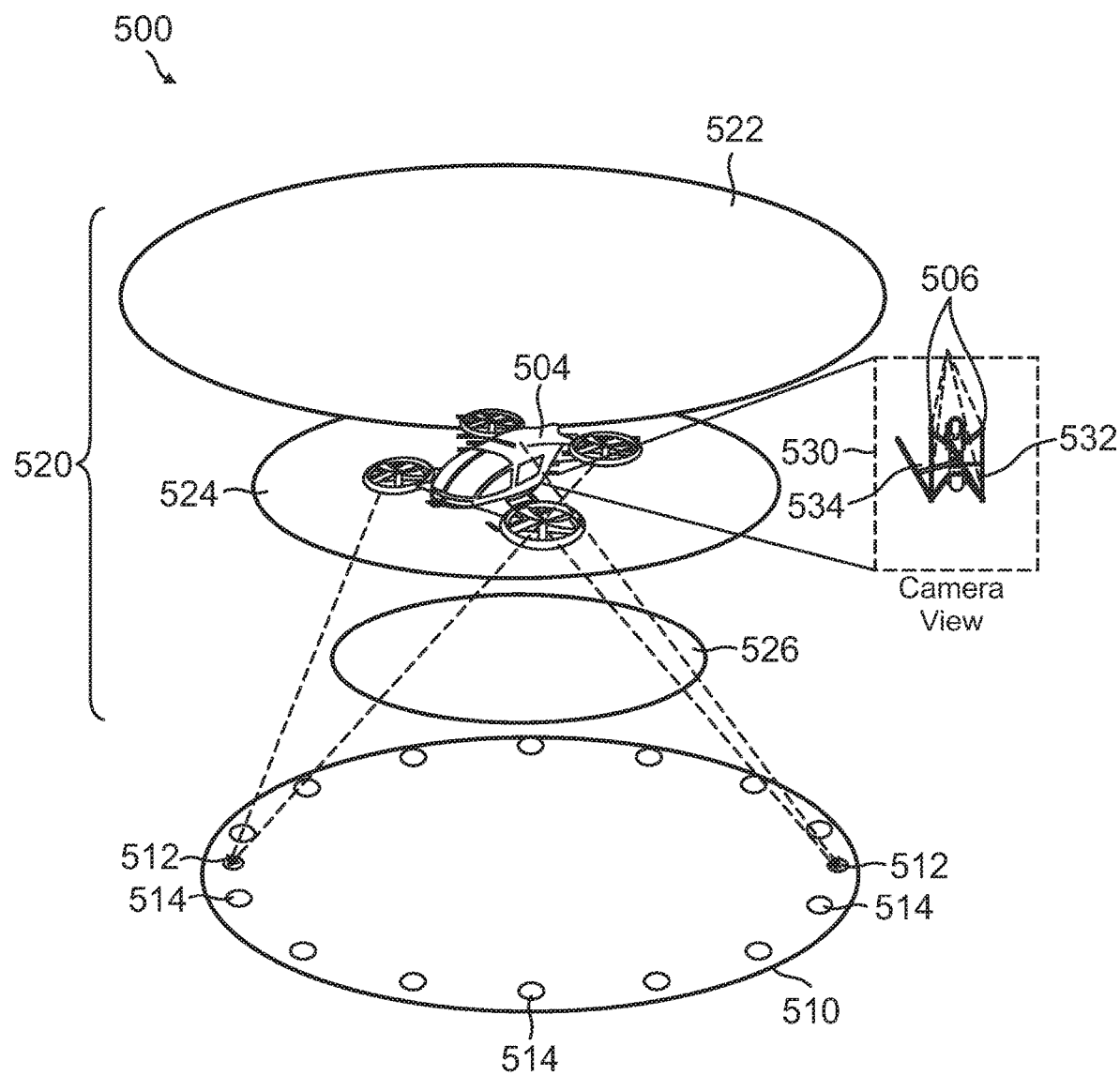
FIGS. 5A and 5B are schematic diagrams illustrating a landing approach sequence, according to one example.
Figure 5B:
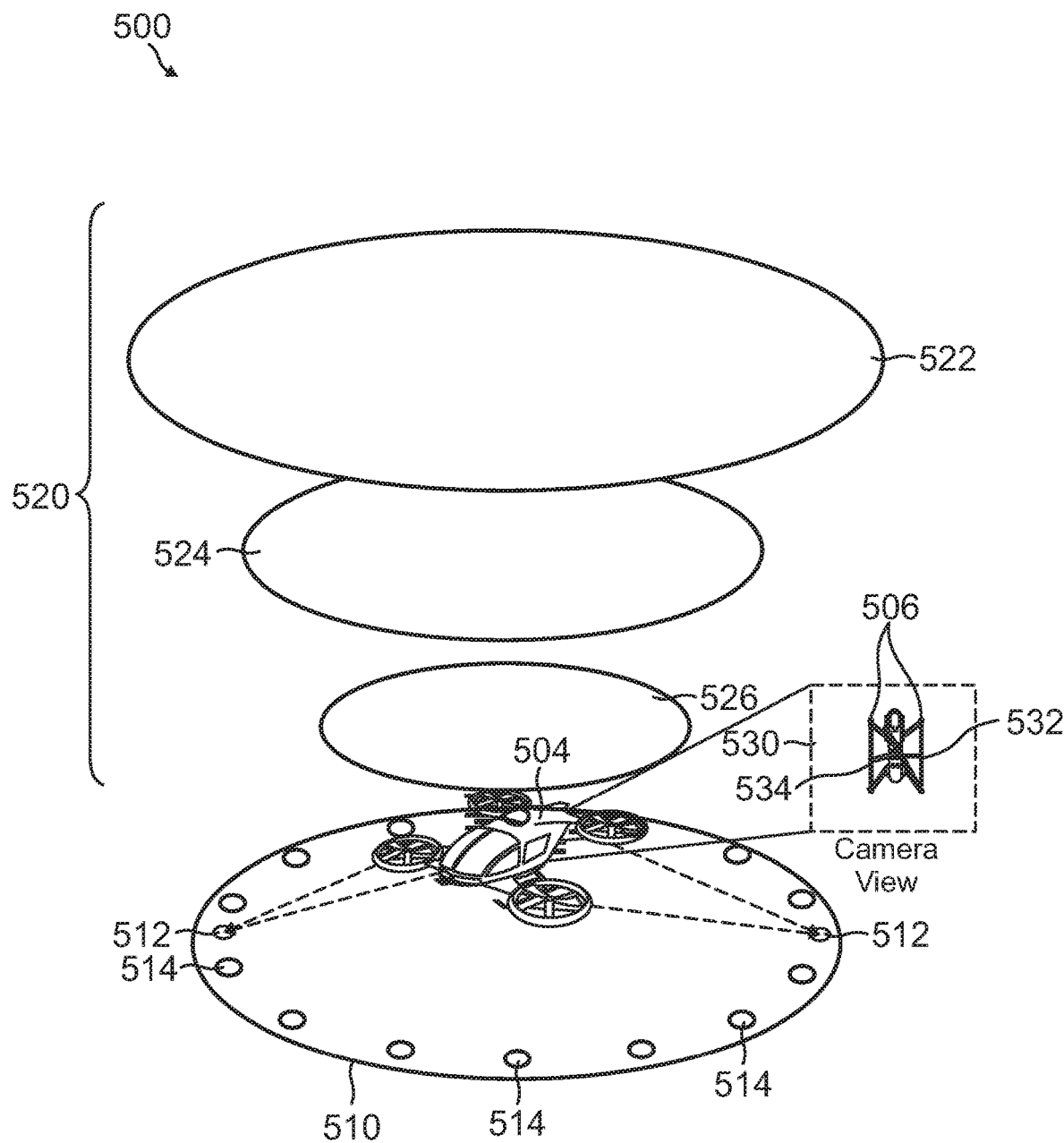

FIGS. 5A and 5B are schematic diagrams illustrating an example landing approach sequence 500 for a UAM vehicle 504, according to the present approach. As shown, a landing site 510 of a vertiport has a circular pattern. A set of IR cameras 512 and multiple ground landing lights 514 are placed around a perimeter of landing site 510. A set of IR probes 506 are externally mounted on UAM vehicle 504 so as to be visible to IR cameras 512 at landing site 510.

A sensor fusion system at the vertiport includes a LiDAR device that cooperates with IR cameras 512 to project a conical detection area 520 having virtual approach rings, including an initial approach ring 522, a decision approach ring 524, and a final approach ring 526. The virtual approach rings are formed with the aid of IR cameras 512, IR probes 506, and the LiDAR device to predict approach thresholds based on the speed and altitude of UAM vehicle 504. Each virtual approach ring provides threshold limits for the speed and desired descent rate of UAM vehicle 504.

The location of IR probes 506 on UAM vehicle 504 enable IR cameras 512 to construct a virtual current approach frame and the virtual approach rings. The IR probes 506 provide aid to IR cameras 512 in determining the virtual current approach frame for UAM vehicle 504 in any kind of visual condition, irrespective of the surrounding environment. An image of the virtual approach rings, including initial approach ring 522, decision approach ring 524, and final approach ring 526, can be shown as a 3D rendering on a display system of UAM vehicle 504.

During landing approach sequence 500, the virtual approach rings are used to track the approach of UAM vehicle 504. For example, when UAM vehicle 504 touches the air space represented by one of the virtual approach rings, the sensor fusion system determines a position and approach path of UAM vehicle 504, allowing correctional feedback to be sent to UAM vehicle 504 for its approach before touching the air space represented by the next virtual approach ring.

As depicted in FIGS. 5A and 5B, a camera view 530 shows a virtual current approach frame 532 and a predefined approach frame 534. As illustrated in FIG. 5A, virtual current approach frame 532 and predefined approach frame 534 are slightly offset from each other, but still within camera view 530. As depicted in FIG. 5B, when UAM vehicle 504 has successfully passed through the space corresponding to each of the virtual approach rings, virtual current approach frame 532 and predefined approach frame 534 are aligned and match each other as shown in camera view 530.

The ground landing lights 514 can change color depending on the approach of UAM vehicle 504. The color of ground landing lights 514 can be determined based on the approach orientation of UAM vehicle 504 in a virtual approach ring as determined by the sensor fusion system. For example, ground landing lights 514 can have a red color prior to UAM vehicle 504 touching down at landing site 510, indicating that the approach is not yet correct. When UAM vehicle 504 has successfully passed through the space corresponding to each of the virtual approach rings, ground landing lights 514 can change to a green color, indicating that the approach is now correct for landing. The visual support provided by ground landing lights 514 can help a pilot of UAM vehicle 504 to adjust the approach as needed.

In addition, the images of the virtual approach rings on the vehicle display system can also change color depending on the approach of UAM vehicle 504. For example, initial approach ring 522 can have a green color, indicating that UAM vehicle 504 is approved to start the approach and landing activity. The decision approach ring 524 and final approach ring 526 can have a red color prior to UAM vehicle 504 touching down at landing site 510, indicating that the approach is not yet correct. When UAM vehicle 504 has successfully passed through the space corresponding to the virtual approach rings, decision approach ring 524 and final approach ring 526 can change to a green color, indicating that the approach is now correct for landing.

The one or more processors and/or other computational devices used in the methods and systems described herein may be implemented using software, firmware, hardware, or appropriate combinations thereof. The processors and/or other computational devices may be supplemented by, or incorporated in, specially-designed application-specific integrated circuits (ASICs) or field programmable gate arrays (FPGAs). In some implementations, the processors and/or other computational devices may communicate through one or more transceivers with other computing devices outside of the navigation system, such as those associated with a management system or computing devices associated with other subsystems controlled by the management system. The processors and/or other computational devices can also include or function with software programs, firmware, or other computer readable instructions for carrying out various process tasks, calculations, and control functions used in the method and system described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures. In addition, cloud computing and cloud based storage methods can also be employed.

Example Embodiments

Example 1 includes a method comprising: receiving a landing request from an aircraft at a ground control center of a vertiport; activating one or more infrared cameras located at a landing site of the vertiport when the received landing request is approved by the ground control center; searching for the aircraft based on one or more light strobes located on the aircraft using the one or more infrared cameras; creating a virtual current approach frame of the aircraft when the light strobes are detected by the one or more infrared cameras; comparing the virtual current approach frame to a predefined approach frame stored by the ground control center to determine whether a landing approach of the aircraft is suitable to provide a safe landing for the aircraft; if the landing approach of the aircraft is not suitable, sending correctional feedback information to the aircraft from the ground control center to provide corrected guidance for the landing approach based on a difference between the predefined approach frame and the virtual current approach frame; and projecting a conical area for aircraft detection, the conical area including a set of virtual approach rings each having predicted approach threshold values based on aircraft parameters.

Example 2 includes the method of Example 1, wherein the corrected guidance is based on a speed, altitude, and descent rate of the aircraft using a sensor fusion system and current state data of the aircraft.

Example 3 includes the method of Example 2, wherein the conical area is projected using the sensor fusion system, and the predicted approach threshold values are based on the speed, altitude, and descent rate of the aircraft.

Example 4 includes the method of any of Examples 2-3, wherein the virtual approach rings are dynamically variable and comprise: an initial approach ring configured to confirm a decision from the aircraft to start approach and landing activity; a decision approach ring configured to ensure the aircraft is following a corrected approach path based on the corrected guidance; and a final approach ring configured to restrict the aircraft to follow calculated speed and descent rate data gathered from the sensor fusion system.

Example 5 includes the method of any of Examples 2-4, wherein the sensor fusion system comprises: a light detection and ranging (LiDAR) unit in operative communication with the one or more infrared cameras, the LiDAR unit configured to produce an image that is a three-dimensional (3D) rendering of a landing space over the landing site.

Example 6 includes the method of any of Examples 1-5, wherein the aircraft includes a display system that performs a process comprising: activating an aural alert or a visual alert for a pilot in case of a deviation of the aircraft from one or more of the virtual approach rings; and receiving information from the ground control center about guidance, including a speed limit threshold in each of the virtual approach rings to maintain a desired speed to avoid a harsh landing of the aircraft.

Example 7 includes the method of any of Examples 1-6, wherein the landing site includes a ground landing light system comprising a set of lights placed around the landing site that change color depending on approach parameters of the aircraft.

Example 8 includes the method of any of Examples 1-7, wherein the aircraft is a crewed aircraft.

Example 9 includes the method of any of Examples 1-7, wherein the aircraft is an uncrewed aircraft.

Example 10 includes the method of any of Examples 1-9, wherein the aircraft comprises a vertical takeoff and landing (VTOL) vehicle, or an urban air mobility (UAM) vehicle.

Example 11 includes a system comprising: a ground-based subsystem located at a vertiport and comprising: a camera system including one or more infrared cameras located at a landing site of the vertiport, the camera system configured to provide image processing of image data captured by the one or more infrared cameras; a sensor fusion system in operative communication with the camera system, the sensor fusion system configured to provide data fusion processing; a ground landing light system including a set of lights located at the landing site; and a ground control center that operatively communicates with the camera system, the sensor fusion system, and the ground landing light system; an airborne subsystem onboard at least one aircraft and comprising: a light strobe system including a set of infrared strobes mounted externally on the at least one aircraft; wherein when a landing request from an aircraft in a request queue is approved by the ground control center, the one or more infrared cameras are activated and search for the approved aircraft based on infrared strobes mounted externally on the approved aircraft; wherein a virtual current approach frame of the approved aircraft is created when the infrared strobes are detected by the one or more infrared cameras; wherein the virtual current approach frame is compared to a predefined approach frame stored by the ground control center to determine whether a landing approach of the approved aircraft is suitable to provide a safe landing; wherein if the landing approach is not suitable to provide a safe landing, the ground control center sends correctional feedback information to the approved aircraft to provide corrected guidance for the landing approach based on a difference between the predefined approach frame and the virtual current approach frame; wherein the sensor fusion system is configured to project a conical area for aircraft detection, the conical area including a set of virtual approach rings each having predicted approach threshold values based on aircraft parameters.

Example 12 includes the system of Example 11, wherein the sensor fusion system comprises: a light detection and ranging (LiDAR) unit in operative communication with the one or more infrared cameras, the LiDAR unit configured to produce an image that is a three-dimensional (3D) rendering of a landing space over the landing site, the image including the set of virtual approach rings.

Example 13 includes the system of any of Examples 11-12, wherein the lights located at the landing site are configured to change color depending on approach parameters of the approved aircraft.

Example 14 includes the system of any of Examples 11-13, wherein the corrected guidance is determined based on a speed, altitude, and descent rate of the approved aircraft, using the sensor fusion system and current state data of the approved aircraft.

Example 15 includes the system of Example 14, wherein the predicted approach threshold values are based on the speed, altitude, and descent rate of the approved aircraft.

Example 16 includes the system of any of Examples 11-15, wherein the virtual approach rings are dynamically variable and comprise: an initial approach ring configured to confirm a decision from the approved aircraft to start approach and landing activity; a decision approach ring configured to ensure the approved aircraft is following a corrected approach path based on the corrected guidance; and a final approach ring configured to restrict the approved aircraft to follow calculated speed and descent rate data gathered from the sensor fusion system.

Example 17 includes the system of any of Examples 11-16, wherein the airborne subsystem further comprises: a visual and aural warning system in a cockpit display onboard the at least one aircraft.

Example 18 includes the system of any of Examples 11-17, wherein the at least one aircraft comprises a crewed aircraft.

Example 19 includes the system of any of Examples 11-17, wherein the at least one aircraft comprises an uncrewed aircraft.

Example 20 includes the system of any of Examples 11-19, wherein the at least one aircraft comprises a vertical takeoff and landing (VTOL) vehicle, or an urban air mobility (UAM) vehicle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
    receiving a landing request from an aircraft at a ground control center of a vertiport;
    activating one or more infrared cameras located at a landing site of the vertiport when the received landing request is approved by the ground control center;
    searching for the aircraft based on one or more light strobes located on the aircraft using the one or more infrared cameras;
    creating a virtual current approach frame of the aircraft when the light strobes are detected by the one or more infrared cameras;
    comparing the virtual current approach frame to a predefined approach frame stored by the ground control center to determine whether a landing approach of the aircraft is suitable to provide a safe landing for the aircraft;
    if the landing approach of the aircraft is not suitable, sending correctional feedback information to the aircraft from the ground control center to provide corrected guidance for the landing approach based on a difference between the predefined approach frame and the virtual current approach frame; and
    projecting a conical area for aircraft detection, the conical area including a set of virtual approach rings each having predicted approach threshold values based on aircraft parameters.

2. The method of claim 1, wherein the corrected guidance is based on a speed, altitude, and descent rate of the aircraft using a sensor fusion system and current state data of the aircraft.

3. The method of claim 2, wherein the conical area is projected using the sensor fusion system, and the predicted approach threshold values are based on the speed, altitude, and descent rate of the aircraft.

4. The method of claim 2, wherein the virtual approach rings are dynamically variable and comprise:
    an initial approach ring configured to confirm a decision from the aircraft to start approach and landing activity;
    a decision approach ring configured to ensure the aircraft is following a corrected approach path based on the corrected guidance; and
    a final approach ring configured to restrict the aircraft to follow calculated speed and descent rate data gathered from the sensor fusion system.

5. The method of claim 2, wherein the sensor fusion system comprises:
    a light detection and ranging (LiDAR) unit in operative communication with the one or more infrared cameras, the LiDAR unit configured to produce an image that is a three-dimensional (3D) rendering of a landing space over the landing site.

6. The method of claim 1, wherein the aircraft includes a display system that performs a process comprising:
    activating an aural alert or a visual alert for a pilot in case of a deviation of the aircraft from one or more of the virtual approach rings; and
    receiving information from the ground control center about guidance, including a speed limit threshold in each of the virtual approach rings to maintain a desired speed to avoid a harsh landing of the aircraft.

7. The method of claim 1, wherein the landing site includes a ground landing light system comprising a set of lights placed around the landing site that change color depending on approach parameters of the aircraft.

8. The method of claim 1, wherein the aircraft is a crewed aircraft.

9. The method of claim 1, wherein the aircraft is an uncrewed aircraft.

10. The method of claim 1, wherein the aircraft comprises a vertical takeoff and landing (VTOL) vehicle, or an urban air mobility (UAM) vehicle.

11. A system comprising:
a ground-based subsystem located at a vertiport and comprising:
    a camera system including one or more infrared cameras located at a landing site of the vertiport, the camera system configured to provide image processing of image data captured by the one or more infrared cameras;
    a sensor fusion system in operative communication with the camera system, the sensor fusion system configured to provide data fusion processing;
    a ground landing light system including a set of lights located at the landing site; and
    a ground control center that operatively communicates with the camera system, the sensor fusion system, and the ground landing light system;
an airborne subsystem onboard at least one aircraft and comprising:
    a light strobe system including a set of infrared strobes mounted externally on the at least one aircraft;
wherein when a landing request from an aircraft in a request queue is approved by the ground control center, the one or more infrared cameras are activated and search for the approved aircraft based on infrared strobes mounted externally on the approved aircraft;
wherein a virtual current approach frame of the approved aircraft is created when the infrared strobes are detected by the one or more infrared cameras;
wherein the virtual current approach frame is compared to a predefined approach frame stored by the ground control center to determine whether a landing approach of the approved aircraft is suitable to provide a safe landing;
wherein if the landing approach is not suitable to provide a safe landing, the ground control center sends correctional feedback information to the approved aircraft to provide corrected guidance for the landing approach based on a difference between the predefined approach frame and the virtual current approach frame;
wherein the sensor fusion system is configured to project a conical area for aircraft detection, the conical area including a set of virtual approach rings each having predicted approach threshold values based on aircraft parameters.

12. The system of claim 11, wherein the sensor fusion system comprises:
a light detection and ranging (LiDAR) unit in operative communication with the one or more infrared cameras, the LiDAR unit configured to produce an image that is a three-dimensional (3D) rendering of a landing space over the landing site, the image including the set of virtual approach rings.

13. The system of claim 11, wherein the lights located at the landing site are configured to change color depending on approach parameters of the approved aircraft.

14. The system of claim 11, wherein the corrected guidance is determined based on a speed, altitude, and descent rate of the approved aircraft, using the sensor fusion system and current state data of the approved aircraft.

15. The system of claim 14, wherein the predicted approach threshold values are based on the speed, altitude, and descent rate of the approved aircraft.

16. The system of claim 11, wherein the virtual approach rings are dynamically variable and comprise:
an initial approach ring configured to confirm a decision from the approved aircraft to start approach and landing activity;
a decision approach ring configured to ensure the approved aircraft is following a corrected approach path based on the corrected guidance; and
a final approach ring configured to restrict the approved aircraft to follow calculated speed and descent rate data gathered from the sensor fusion system.

17. The system of claim 11, wherein the airborne subsystem further comprises:
a visual and aural warning system in a cockpit display onboard the at least one aircraft.

18. The system of claim 11, wherein the at least one aircraft comprises a crewed aircraft.

19. The system of claim 11, wherein the at least one aircraft comprises an uncrewed aircraft.

20. The system of claim 11, wherein the at least one aircraft comprises a vertical takeoff and landing (VTOL) vehicle, or an urban air mobility (UAM) vehicle.

* * * * *